US011234552B2

(12) United States Patent
Noall et al.

(10) Patent No.: US 11,234,552 B2
(45) Date of Patent: Feb. 1, 2022

(54) HYDRATION PACK INFUSER

(71) Applicant: Infuze, LLC, Wellsville, UT (US)

(72) Inventors: Daniel Noall, Wellsville, UT (US); Nathan Erickson, Beaverdam, UT (US); Shane McKenna, Salt Lake City, UT (US)

(73) Assignee: Infuze, LLC, Wellsville, UT (US)

( * ) Notice: Subject to any disclaimer, the term of this patent is extended or adjusted under 35 U.S.C. 154(b) by 399 days.

(21) Appl. No.: 16/162,371

(22) Filed: Oct. 16, 2018

(65) Prior Publication Data

US 2020/0113370 A1    Apr. 16, 2020

(51) Int. Cl.
| | |
|---|---|
| *B01F 5/04* | (2006.01) |
| *A47J 31/40* | (2006.01) |
| *A47J 41/02* | (2006.01) |
| *A45F 3/16* | (2006.01) |
| *A47J 31/00* | (2006.01) |

(52) U.S. Cl.
CPC .............. *A47J 31/402* (2013.01); *A45F 3/16* (2013.01); *A47J 31/005* (2013.01); *A45F 2003/166* (2013.01); *B01F 5/0413* (2013.01)

(58) Field of Classification Search
CPC ......... A47J 31/40–41; A47J 41/02–028; B01F 5/0413–043
See application file for complete search history.

(56) References Cited

U.S. PATENT DOCUMENTS

| | | | |
|---|---|---|---|
| 5,217,288 A | 6/1993 | Johnson | |
| 9,498,086 B2 | 11/2016 | Waggoner et al. | |
| 9,795,242 B2 | 10/2017 | Waggoner et al. | |
| 2010/0055252 A1 | 3/2010 | Marina et al. | |
| 2013/0319915 A1* | 12/2013 | Gellibolian | C02F 1/002 210/87 |
| 2015/0057638 A1 | 2/2015 | Davidian et al. | |
| 2016/0296900 A1* | 10/2016 | McKenna | B01F 5/0428 |

OTHER PUBLICATIONS

"Attach, fill, use" uploaded by Infuze Hydration, Apr. 15, 2018 [retrieved on Oct. 23, 2019]. Retrieved from the Internet: <https://www.youtube.com/watch?v=w0deqDVpw1Q>.
Infuze—The World's First Hydration Pack Flavor Infuser' Sep. 20, 2016. [retrieved on Oct. 23, 2019]. Retrieved from the Internet: <https://www.kickstarter.com/projects/infuze/infuze-the-worlds-first-hydration-pack-flavor-infu/description>.
USPTO as International Searching Authority, "International Search Report and Written Opinion," for application No. PCT/US2019/048325, dated Jan. 6, 2020.

* cited by examiner

*Primary Examiner* — Michael A Laflame, Jr.
(74) *Attorney, Agent, or Firm* — Dentons Durham Jones Pinegar (57) ABSTRACT

The system may be a device that allows for mixture of an additive to a substance in a line of flow. The system may include a hydration pack with a reservoir that may contain a first substance, such as water. The system may include a cartridge with an additive that is mixed to the line of flow through a Venturi which may include a rolling seal that is manipulated with a dial a user manipulates to adjust the amount of additive added to the line of flow. The mixed liquid may then be accessed through a hose from the system to a mouth piece. The system may be modular to allow a user to replace the cartridge by disengaging a first component and a second component of the system through a buckling mechanism and replacing the cartridge within the second component. The cartridges may be reusable, recyclable or disposable.

18 Claims, 9 Drawing Sheets

HYDRATION PACK INFUSER

TECHNICAL FIELD

This disclosure relates generally to a hydration pack and/or a hydration pack accessory for adding a substance to a direct line of flow and, more specifically, adding a flavor mix directly into the line flow of water. The assembly may be used to integrate more than strictly flavor to the line of flow of a liquid or gas and may be adjusted by a user.

BACKGROUND

Many different elements and devices have been utilized to add a substance to water to make the water more flavorful by adding flavor to the water. Most uses of flavor adding devices often require that you add the flavor to the entire reservoir of water so that the water takes on the flavor additive. Squeeze bottles, powders and other concentrates have all been utilized to add flavor to water whether it is in a hydration pack, water bottle or other reservoir.

Current devices fail to provide a user an option of adjusting the additive proportion to adjust flavor or replace the additive with another additive mix. Additionally current devices fail to offer an individual the ability to mix the water in the line of flow and not the entire reservoir of water. The following description provides the ability to overcome the shortcomings of current devices and additive options.

It is also well established that a Venturi effect takes place when fluid flows through a restricted area, the fluid pressure is reduced and fluid velocity is increased. A "Venturi" has been established and commonly used to mix gases or liquids into a system when, for example, one liquid flows through the Venturi and uses the energy of a first liquid to entering a converging, a chamber and a diffuser. The first liquid may enter the converging nozzle thus decreasing the pressure and pulling the second liquid into the flow of the fluid going through the converging nozzle and mixing the first and second liquids together.

SUMMARY

This disclosure, at least in at least one aspect, relates to a system, device, or hydration pack assembly may be utilized with reservoir, which allows the user to directly mix flavor, electrolytes, nutrients, vitamins or other substances directly in the line of flow of the liquid or gas. The user may then activate the substance and control the intensity, or mix ratio, of the substance into the liquid or gas by the turn of a dial or switch. The dial may be adjusted pre-flow, post-flow and may also be adjusted mid flow or be shut off entirely.

The substance to be mixed with the liquid or gas is maintained, or held, in a separate cartridge or container that may then be connected to, attached to or integrated with the main body of the device. The mixing of the liquid may be performed through a shuttling or rotational Venturi system. The rotational Venturi may include a rolling seal that may, in a first configuration seal the port and preventing the mixture of a first liquid with a second liquid. The rotational Venturi may "roll" away from the port in a second configuration allowing the flow of the second liquid to mix with the first liquid. The opening motion of the rolling seal allows the mixture of the first and second liquids, but immediately closes after the suction force (and subsequent flow of liquid) is released. This prevents unintended transfer between, and mixture of liquids between the a reservoir of the first liquid and the reservoir of the second liquid. In addition to the venturi/rolling/port seals, a valve (shown as a needle valve in the embodiment) may be used in line with the fluid flow from the second liquid reservoir to control the proportion of the second liquid (the concentrated flavor enhancer) relative to the first liquid. A valve or other mechanism may also be added to meter fluid flow from the first liquid reservoir to the amount of flow of the first liquid to increase system versatility and expand the range of fluid flow ratios. The flow control (needle) valve may be user regulated by an adjustment mechanism, dial system, that proportions a controlled amount of second liquid with the first liquid or in a separate embodiment the Venturi may be user regulated by a push button valve and spring return.

The system may allow for easy change of a cartridge, which may be a flavoring or other enhancing substance such as electrolytes, vitamins, proteins, caffeine, medicine, drugs, etc., and engagement of the system into any hydration pack or other flow line for gases or liquids. The system may include a primary component with the Venturi system and a secondary component with a cartridge disposed within a housing configured to engage the primary component. The primary component and secondary component may be robustly but reversibly engaged to allow a user to replace the cartridge within the system.

The primary component may include a housing that maintains the Venturi with appropriate valves and seals and may further include inlets and outlets for the flow of liquids or gases. Additionally, the primary component may include a dial or other mixing regulator, or flavor dial that can be set to predetermined mixing ratio of the second liquid with the first liquid. The primary component may also include a clipping mechanism that may provide a method to secure the system to a backpack or other carrying case. The clipping mechanism may be easily rotatable to allow for ease when fastening to another element.

The secondary component may include a void, channel or trough, which may be configured to hold, maintain, engage or capture a reservoir, or flavor reservoir, that retains the second liquid. A buckling system that securably engages the first component and second component may include a male portion on the primary component and a female portion on the secondary component such that the male component and female components interlock but may disengage with appropriate frictional force.

DESCRIPTION

The following description sets forth at least one embodiment of a system for infusing a liquid into another liquid. The system may be integrated into a hydration pack that may allow for a flavor to be infused into water from the hydration pack and the flavor is mixed in-line as the water flows through the system such that the flavoring does not have to be mixed in the reservoir of the hydration pack. For purposes of this disclosure "flavor" or "flavoring" means the additive liquid that is retained within the system within a cartridge that may be replaceable within the system.

The system may include a "first configuration" which may be a closed configuration of a Venturi system wherein there is no mixing of the first liquid, which may be water, with the second liquid, which may be the flavoring. The system may include a "second configuration" which may be an open configuration of the Venturi system wherein there is mixing of the flavoring with the water. The second configuration may include multiple positions to allow a different portion of flavoring to flow within the water to change the concentration for a user to drink. The Venturi system may be similar to U.S. Patent Publication No. 2016/0296900 which is incorporated herein by reference in its entirety.

Figure 1:
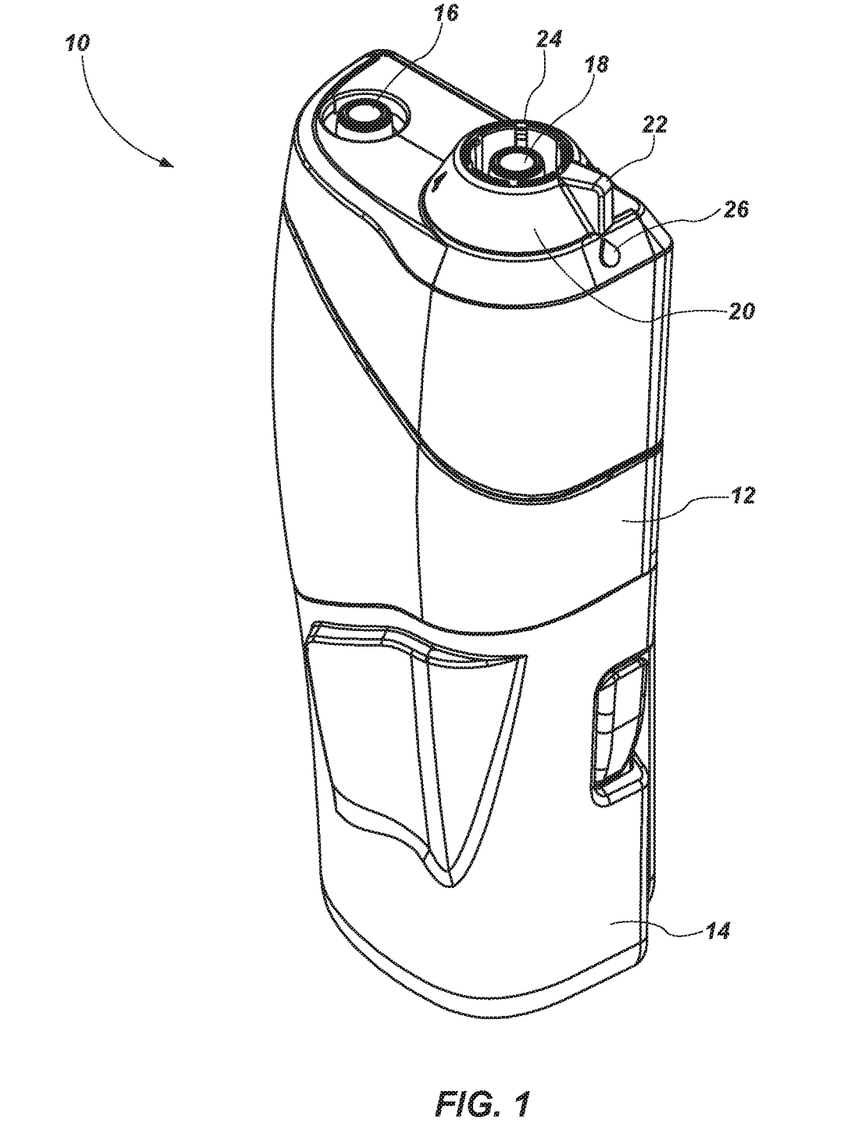
FIG. 1 illustrates an assembled perspective view of the system with a first and second component engaged.

FIG. 1 illustrates a system 10, which may be an infusion system that utilizes a Venturi for mixing a second liquid with a first liquid (it will be appreciate that a gas may also be utilized in this system). The system 10 includes a first component 12, or first housing, or top portion that may hold or maintain the Venturi and a second component 14, or second housing, or bottom portion that may be secured to the first component 12. The first component 12 may include an inlet 16, or first port, configured to engage a first hose or tubing through a tapered or frictional fit, or other means of securing the first hose to the inlet 16. The first hose or tubing may allow for the flow of the first liquid, or water, into the system 10. The inlet 16 may be positioned at or toward the top of the first component 12. An outlet, 18, or second port, may be positioned at or toward the top of the first component as well and spaced apart from the inlet 16. The outlet 18 is configured to engage a second hose or tubing through a tapered frictional fit, or other means of securing the second hose to the outlet 18. The outlet 18 may allow for mixed liquid (or unmixed if the user chooses) to flow out of the system 10 and to a mouthpiece for a user to ingest.

The outlet 18 may be circumferentially surrounded, at least partially, by a dial 20, or adjustment mechanism. The dial 20 may be rotated in either direction to allow a user to manipulate the amount of second liquid, that is maintained within the system 10, is mixed with the first liquid. The dial 20 may include a flange 22 allowing a user to easily twist or rotate the dial 20 to a desire position. The dial 20 may include a plurality of presets 24, which may be predetermined concentrations, that when rotated engage the Venturi system to allow a predetermined amount of additive, a second liquid, or flavoring to mix into the first liquid, or water. The first component 12 may also include an indicator 26 that displays the positioning of the dial 20 such that a user is able to determine the level of concentration of the mixture liquid.

The first component 12 may further include at least one projection 28, or post, or protrusion, or arm, which may extend downwardly from the bottom of the first component 12 and is configured to engage the second component 14. The at least one projection 28 may comprise multiple or a plurality of projections. In this embodiment, two projections 28, or arms, which may be positioned at opposite sides of the first component 12, wherein each projection engages opposing sides of the second component 14. The projection 28 may include a shoulder 30, or ridge, or barb, which allows the projection 28 to reversibly engage the second component 14; however, the shoulder 30 may engage the second component 14 such that a user must apply substantial force to overcome the engagement of the projection 28 from the second component 14. The projection 28 may be deformable to slide within the second component 14.

The second component 14 may include a void 32 (see FIG. 2) as well as at least one aperture 34. The at least one aperture 34 may include a plurality of apertures that allow for exposure of the projection 28 through the aperture 34. In at least this embodiment, the apertures 34 are positioned on opposite sides of the second component 14 and complementary fit with the projections 28. The apertures 34 may allow a user to apply force to the projections 28 to allow the first component 12 to disengage from the second component 14. The projections 28 and the apertures 34 may resemble a buckling mechanism, or buckle system, wherein the projections 28 "snap" into place within the apertures 34 and secure the first component 12 to the second component 14 which may comprise an engagement feature. The projections 28 may be manipulated in a medial direction and then extend laterally when the projections 28 with the shouldered ends 30 engage the apertures 34. A user may than provide sufficient force by squeezing the projections 28 through the apertures 34 to disengage the shoulders 30 from the apertures 34. The arms 28 and the apertures 34 with the shoulders 30 may make up the entire engagement feature, or a first engagement feature and a second engagement feature.

Alternatively, a bayonet connection may be utilized to connect the first component 12 to the second component 14. In the bayonet connection wherein a first engagement feature may be included with the first component 12 and a second engagement feature is reversibly connected to the first component.

Figure 2:
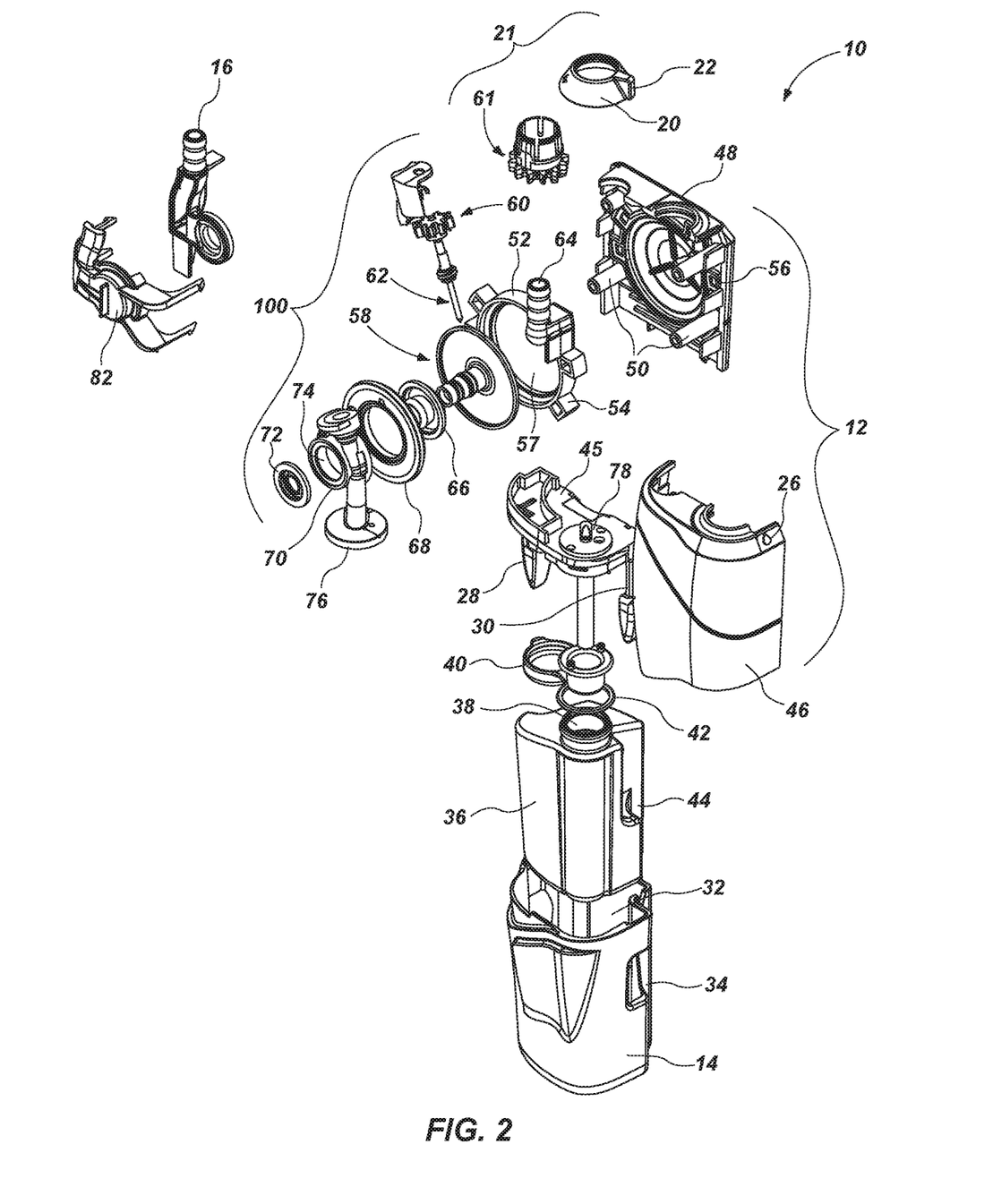
FIG. 2 illustrates an exploded perspective view of the system of FIG. 1.
Figure 3:
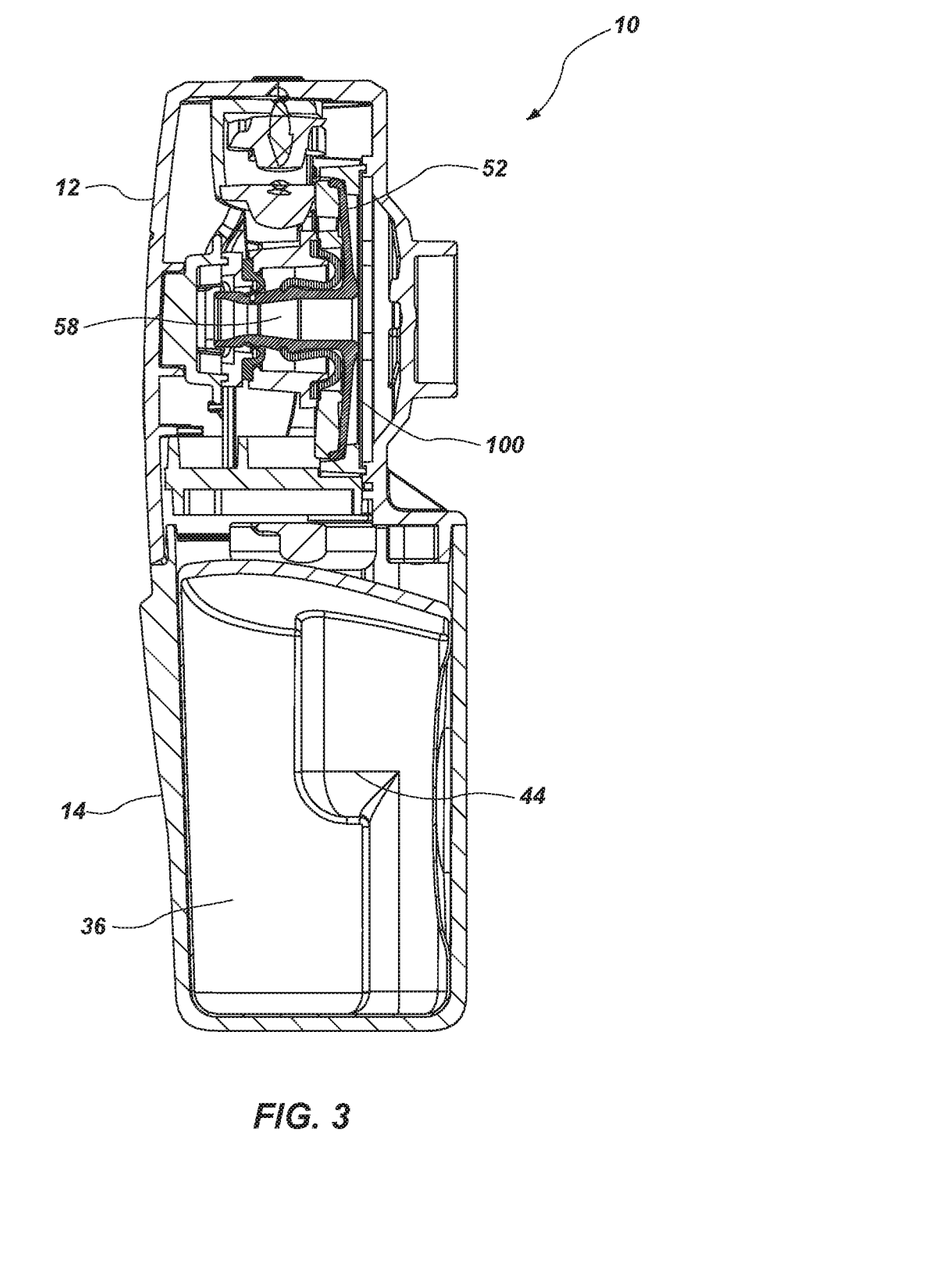
FIG. 3 illustrates a first side view of the system of FIG. 1.

Referring to FIGS. 2 and 3, the system 10 is depicted in an exploded and cross-sectional views exposing its component parts. The second component 14 includes the void 32, or trough, configured to hold a cartridge 36, or additive reservoir. The void 32 may be exposed or include an opening at or toward the top of the second component 14. The void 32 may be sufficiently deep to hold at least a portion of the cartridge 36 and even a substantial portion. The void 32 may provide a complementary fit with the cartridge 36 wherein the cartridge 36 may easily slide into and out of the void 32.

The cartridge 36 may be entirely enclosed with a single cartridge opening 38 toward the top of the cartridge 36 with the cartridge opening protruding upward from the body of the cartridge 36. The cartridge opening 38 may include a cap 40 with ring 42 wherein the ring may circumferentially engage the cartridge opening 38 securing the cap 40 to the cartridge 36. The cap 40 may cover the cartridge opening 38 to prevent spill of the additive. The cap 40 may be removed from the cartridge opening 38 before or after insertion of the cartridge 36 into the void 32 of the second component 14. The cartridge 36 may further include a series of cutouts 44 running at least partially longitudinally along the length of the cartridge (in an upward/downward direction) that allow for the projections 28 from the first component 12 to slide adjacent to the cartridge 36 and the second component 14 to engage the apertures 34 of the second component 14 and thus secure the first component 12 to the second component 14.

The first component 12 may include a front plate 46 and a back plate 48 that may be secured to each other through any means well known in the art, such as screws, friction fit, snap fit, glue, welding or the like. In this embodiment a series of posts 50 may extend from the back plate 48 toward the front plate 46 and engage snap like features on an interior all of the front plate 46. The housing of the first component 12 may contain the Venturi system and mixing chamber to allow the additive to be mixed with the first liquid. A base plate 45 may be positioned and secured toward the bottom of the first component 12 and may engage the front and back plates to form a complete housing of the first component. The base plate 45 may include the projections 28 as previously disclosed herein. It will be appreciated that while the first component 12 may appear modular and secured by traditional means known in the art, that the first component may be made from a single part that may be injection molded polymer, plastic or similar material.

A Venturi system 100 may include an outlet manifold 52 be configured to engage the back plate 48 of the first component and may include flanges 54 extending laterally from the outlet manifold 52. The flanges 54 may have complementary indents 56 embedded in the back plate 48 to hold the outlet manifold 52 in place within the first component 12. The outlet manifold 52 may comprise a central opening 57 which may engage and hold a top portion of a Venturi 58 toward the back plate 48. The outlet manifold 52 may also include a protruding cylinder 64, or outlet, which may extend superiorly (or toward the top) of the system 10 with a channel passing therethrough. The cylinder 64 may allow for passage of the mixed liquid from the Venturi 58 to a second hose, or tubing. The cylinder 64 may include ridges or barbs to frictionally engage the second hose. The second hose may lead to a mouthpiece that a user may suck from to ingest the mixed liquid.

A vessel needle assembly 60 engages the dial 20. The dial 20 and vessel needle assembly 60 may comprise a gear assembly 61, or ratchet mechanism, that when the dial 20 is turned the vessel needle assembly 60 displaces a needle valve 62 such that more additive or less additive is mixed with the first liquid depending on the directive rotation of the dial 20. The gear assembly 61 and the dial 20 comprise the dial assembly 21. Alternatively, the dial may comprise a small tab that interfaces with a gear to give tactile feedback of the fluid and prevent the dial from inadvertently moving from a prepositioned setting.

The Venturi 58 may be positioned anterior the outlet manifold 52 with a rolling seal 66 positioned anterior the Venturi 64. However, the rolling seal 66 may circumferentially engage the Venturi 58 such that the rolling seal 66 at least partially seals the Venturi inlet ports that allow additive to mix with the first liquid. The rolling seal 66 may provide a watertight seal when no additive is being mixed with the first liquid. A diaphragm seal 68 may also circumferentially engage the Venturi 64 and/or the rolling seal 66 providing a further watertight seal to the Venturi 64.

A mixing chamber 70 may be positioned anterior the diaphragm seal 68 wherein at least a portion of the Venturi 64 passes through the mixing chamber 70. The mixing chamber 70 may comprise a port seal 72 with a first mixing chamber opening 74 toward an anterior end of the mixing chamber 70, which allows for passage of the first liquid into the mixing chamber 70. The mixing chamber 70 may also include and additive inlet 76 that may extend inferiorly from the mixing chamber 70 toward the cartridge 36 and/or the second component 14.

The additive inlet 76 may engage the base plate 45 at a base plate port 78 that allows for passage of the additive through to the mixing chamber 70. A straw 79 may extend from the base plate port 78 into the cartridge 36. A duckbill housing 80, or seal, may frictionally engage the cartridge opening 38 as well as seal against the base plate port 78. While a straw 79 may be utilized, alternatively, the cartridge 36 may be collapsible such that a straw may not be needed to move the additive from the cartridge 36 to the line of flow, or remove the additive from the cartridge 36.

The first component 12 further includes the first liquid inlet 16, or port, which may be include barbs, or ridges, that may engage a first hose or tubing. The barbs or ridges may allow for reversible engage of the first hose and provide a water-tight seal for the first liquid to pass from the first hose into the system 10. The first liquid inlet 16 provides passage of the first liquid into the mixing chamber 70. A stabilizing member 82 engages the first liquid inlet 16 and the most anterior portion of the Venturi system 100 at the port seal 72 providing water tight seal and stability to the Venturi system 100.

Each of the component parts of the system 10 are configured to be easily replaceable for repairs, if required. While the Venturi system 100 appears modular in the disclosed embodiment the Venturi system 100 may be provided pre-assembled and may be easily engaged and disengaged within the first component 12 of the system 10.

Figure 4:
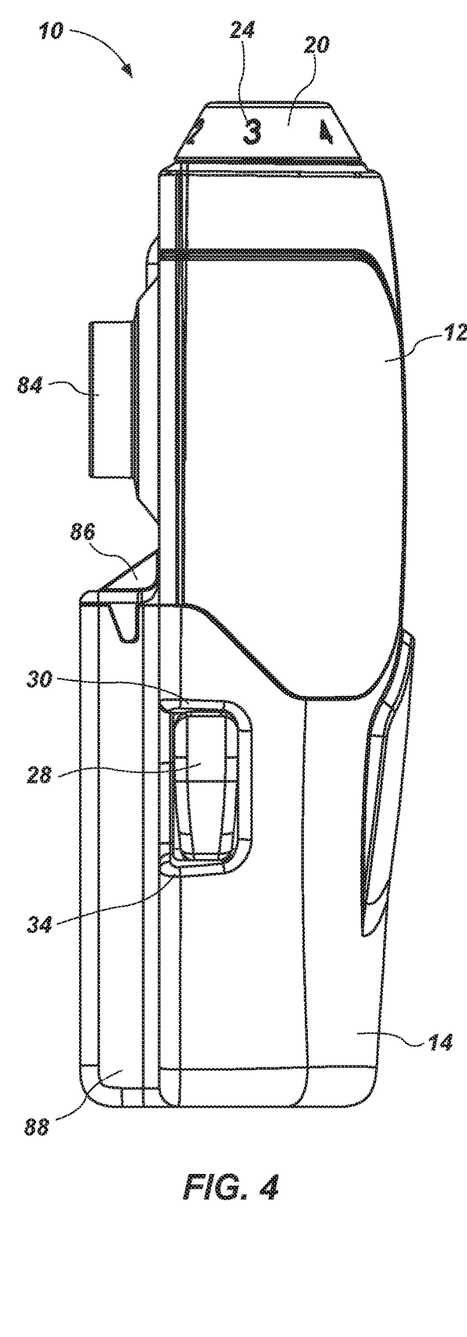
FIG. 4 illustrates a second side view of the system of FIG. 1.

Referring to FIG. 4, a first lateral side of the system 10 is depicted with the first component 12 positioned superior the second component 14. A clip engagement mechanism 84 may extend posteriorly from the first component and may provide attachment of a clip. The clip engagement mechanism 84 may allow a clip to rotate up to 300° with a rotational axis non-parallel (and may be substantially perpendicular) to the body of the first component. A distal end of the at least one projections 28 can be seen through the at least one apertures 34.

Figure 5:
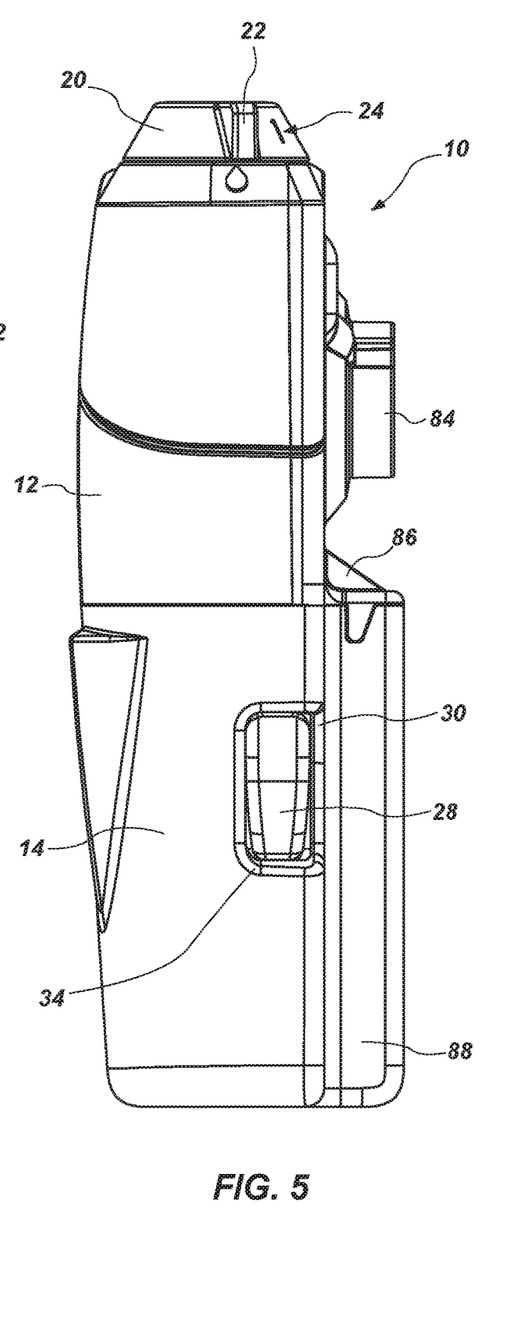
FIG. 5 illustrates a top view of the system of FIG. 1.

Referring to FIG. 5, a second lateral side of the system 10 is depicted with the first component 12 positioned superior the second component 14. Similar to the first lateral side, the second lateral side also shows a distal end of the at least one projections 28 seen through the at least one apertures 34. The second component 14 may be wider, or broader, than the first component 12 in an anterior/posterior direction, to allow the cartridge 36 to easily fit within the second component 14. The first component may include an posterior protrusion 86 which may extend posteriorly and inferiorly and may frictionally engage a posterior portion of the second component 14 to provide a seal, which may be watertight (see FIG. 8*b*).

Referring to FIGS. 4 and 5, the projections 28 when engaged with the apertures 34 may provide a nearly flush seal with the projections extending, at least partially, out of the apertures 34.

Figure 6:
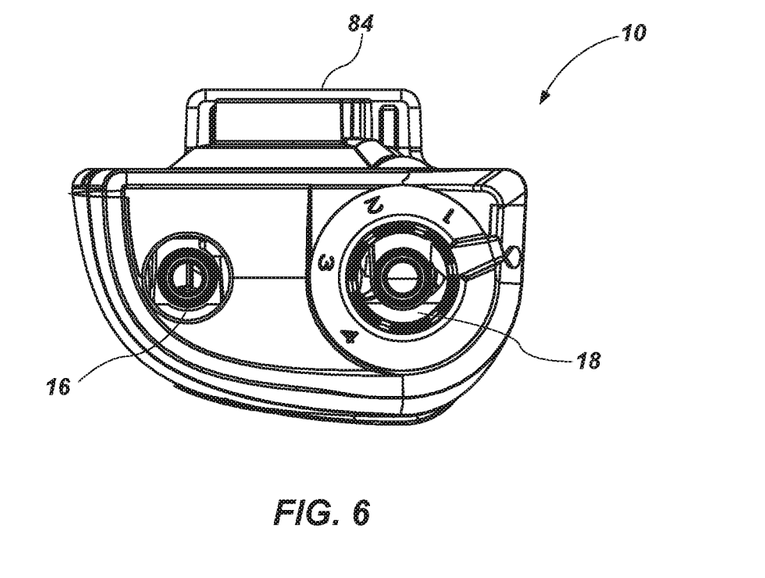
FIG. 6 illustrates a bottom view of the system of FIG. 1.

Referring to FIG. 6, the system 10 is depicted from a top view. The dial 20 may include numbers or other identification features that allow a user to easily determine the level of additive that is being mixed. The first liquid inlet 16 is displaced, or spaced apart from the outlet 18. The first liquid inlet 16 may reside entirely within the first component 12 housing wherein a tip of the first liquid inlet 16 is flush with the top surface of the second component 12. Alternatively the first liquid inlet may protrude, at least partially, from the top surface of the first component 12. Likewise, the outlet 18 may reside entirely within the first component 12 housing or alternatively it may also protrude, at least partially, from the top surface of the first component 12. In yet another alternative, the dial 20 may extend from the top surface of the first component 12 with the outlet 18 positioned within the dial 20, the dial 20 at least partially, or even entirely, circumferentially surrounding the outlet 18. The outlet 18 may extend from the second component 12 and into the dial 20 wherein a distal end of the outlet 18 is flush with the dial 20. The dial 20 may be positioned in any of multiple locations on or in the system 10.

Figure 7:
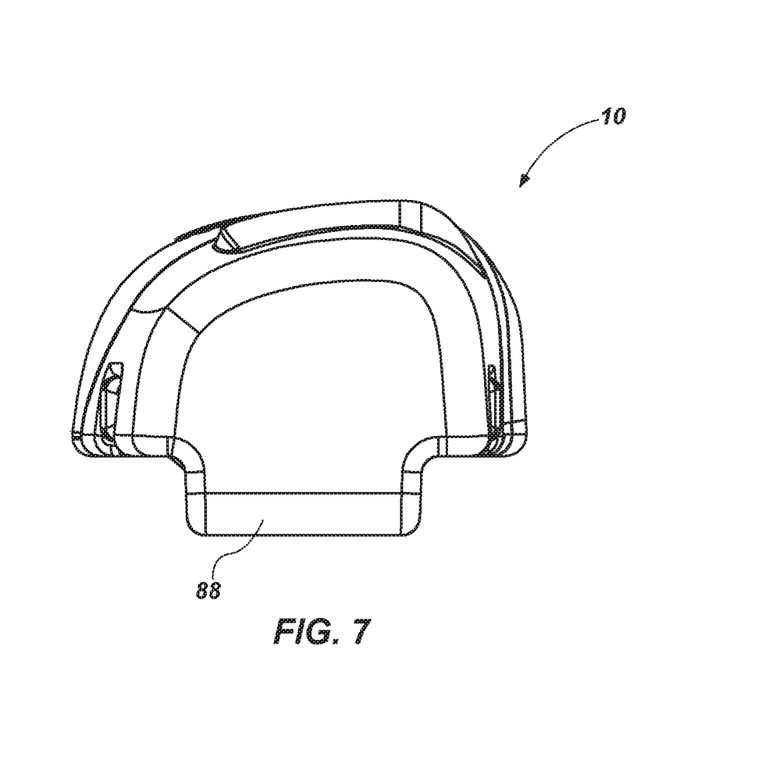
FIG. 7 illustrates a cross sectional side view of the system of FIG. 1.

Referring to FIG. 7, a bottom view of the system 10 is depicted with the base of the second component 14. The second component includes a longitudinal channel 88 that extends the length of the second component 14. The channel 88 is configured to engage the cartridge 36 and provide a type of slide such that the cartridge 36 is configured to only fit within the second component 14 in a single configuration.

Figure 8A:
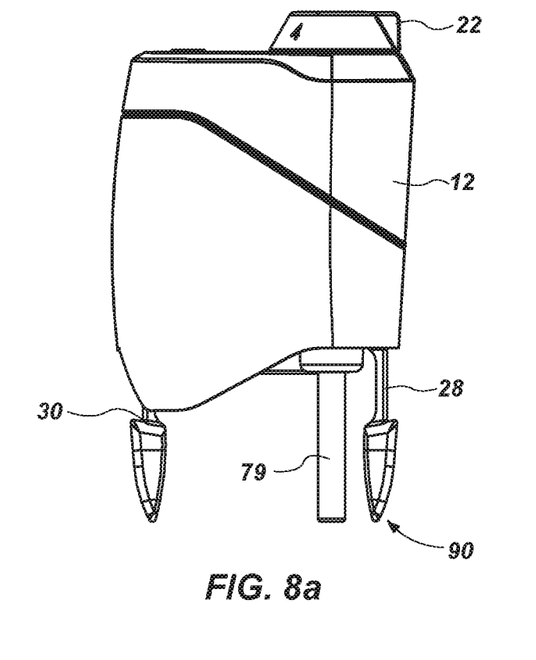
FIG. 8*a* illustrates a front view of the first component of FIG. 1.
Figure 8B:
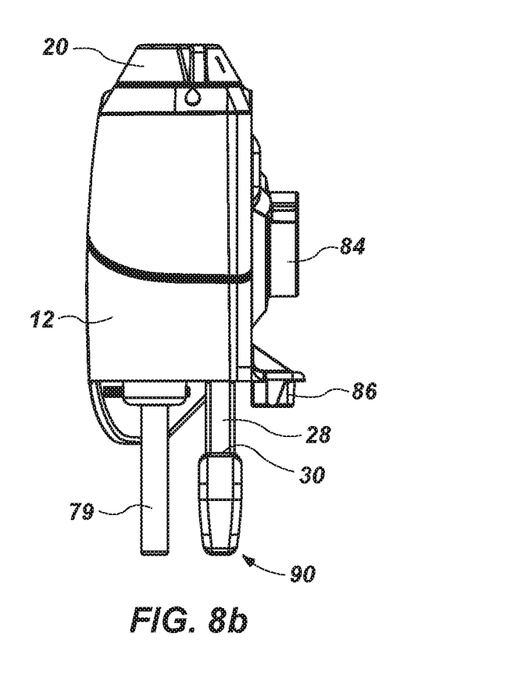
FIG. 8*b* illustrates a side view of the first component of FIG. 1.

Referring to FIGS. 8a and 8b, the first component 12 is depicted disengaged from the second component 14. The projections 28 may extend substantially parallel to each other in an inferior direction from the first component 12. The projections 28 may each include a male end 90, which may be a spear headed end that may include the shoulder 30 that engages the aperture(s) 34 of the second component 14. The male end 90 may resemble the male portion of a buckle. Each of the projections 28 may be of equal length to allow ease of use but it will be appreciated that they length of each may vary as well.

A straw 79 extends inferiorly from the first component 12 and is configured to enter the cartridge 36 through the cartridge opening 38. The straw 79 may extend sufficiently to reach the base or nearly reach the base of the cartridge 36 so as to allow the system 10 to utilize as much of the additive as possible.

Figure 9A:
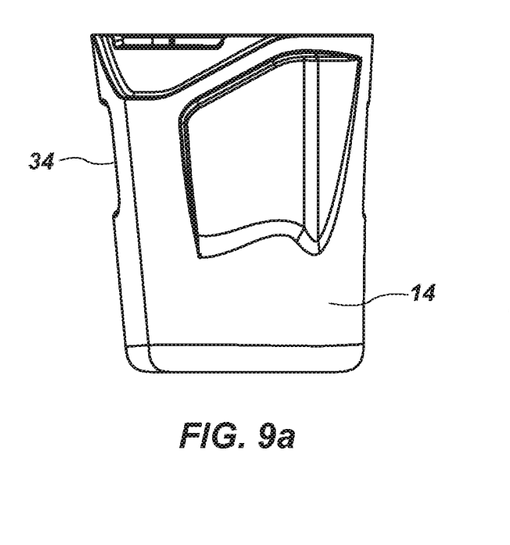
FIG. 9*a* illustrates a front view of the second component of FIG. 1.
Figure 9B:
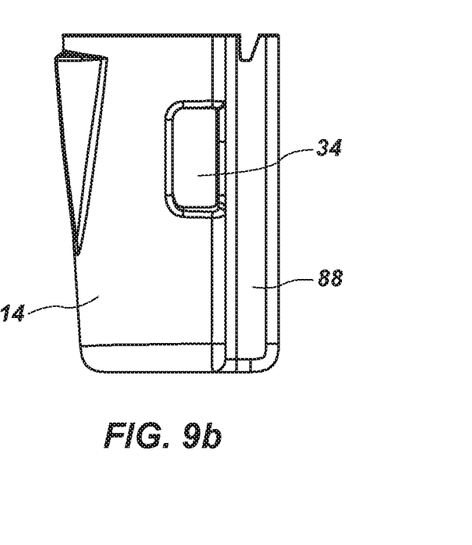
FIG. 9*b* illustrates a side view of the second component of FIG. 1.

Referring to FIGS. 9a and 9b, the second component 14 is depicted disengaged from the first component 12. The apertures 34 may reside on the lateral sides of the second component 34 and each aperture 34 may include indentations 94, or cutouts, that may allow for a user to depress the male end 90 of the projections 28 to allow a user to disengage the second component 14 from the first component 12. The channel 88 may extend from the top to the bottom of the second component 14.

Figure 10A:
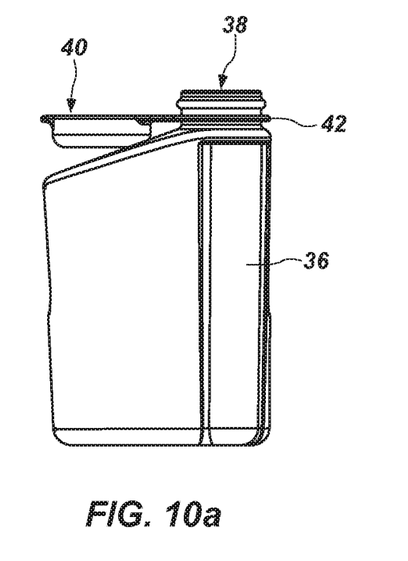
FIG. 10a illustrates a front view of a cartridge which may reside at least partially within the second component of FIGS. 8a and 8b.
Figure 10B:
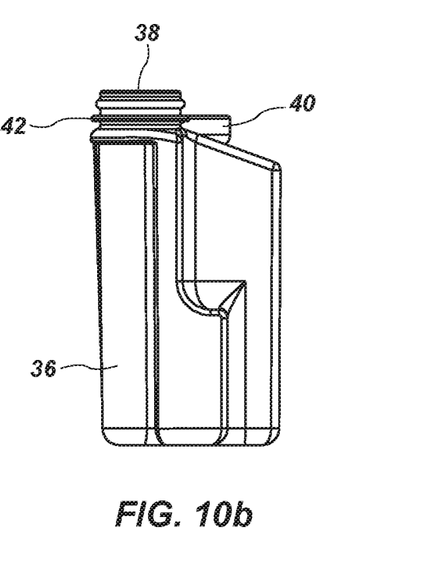
FIG. 10b illustrates a side view of a cartridge which may reside at least partially within the second component of FIGS. 8a and 8b.

Referring to FIGS. 10a and 10b, the cartridge 36 is depicted with the cap 40 removed with the ring 42 of the cap 40 engaging the cartridge opening 38. The cartridge 36 is shaped and configured to allow the cap 40 to be removed and yet still engage the cartridge opening 38 with the ring 42 as well as engage the first component 12 without having to remove the cap 40 entirely because of a tapered edge on the top surface of the cartridge 36. Referring to FIG. 10b, a cartridge extension 96, or dovetail, that extends from a back of the cartridge 36 is configured to slide within the channel 88 of the second component 88. The cartridge extension 96 and channel 88 allow for the cartridge 36 to only fit within the second component 14 in a single direction and single configuration.

The cartridge 36 may essentially comprise a bottle that is able to hold a liquid, the additive, and may be reusable or recyclable. The cartridge 36 may also be disposable and may have a single use and then is disposed of by user and replaced with a new, full, cartridge 36.

Figure 11A:
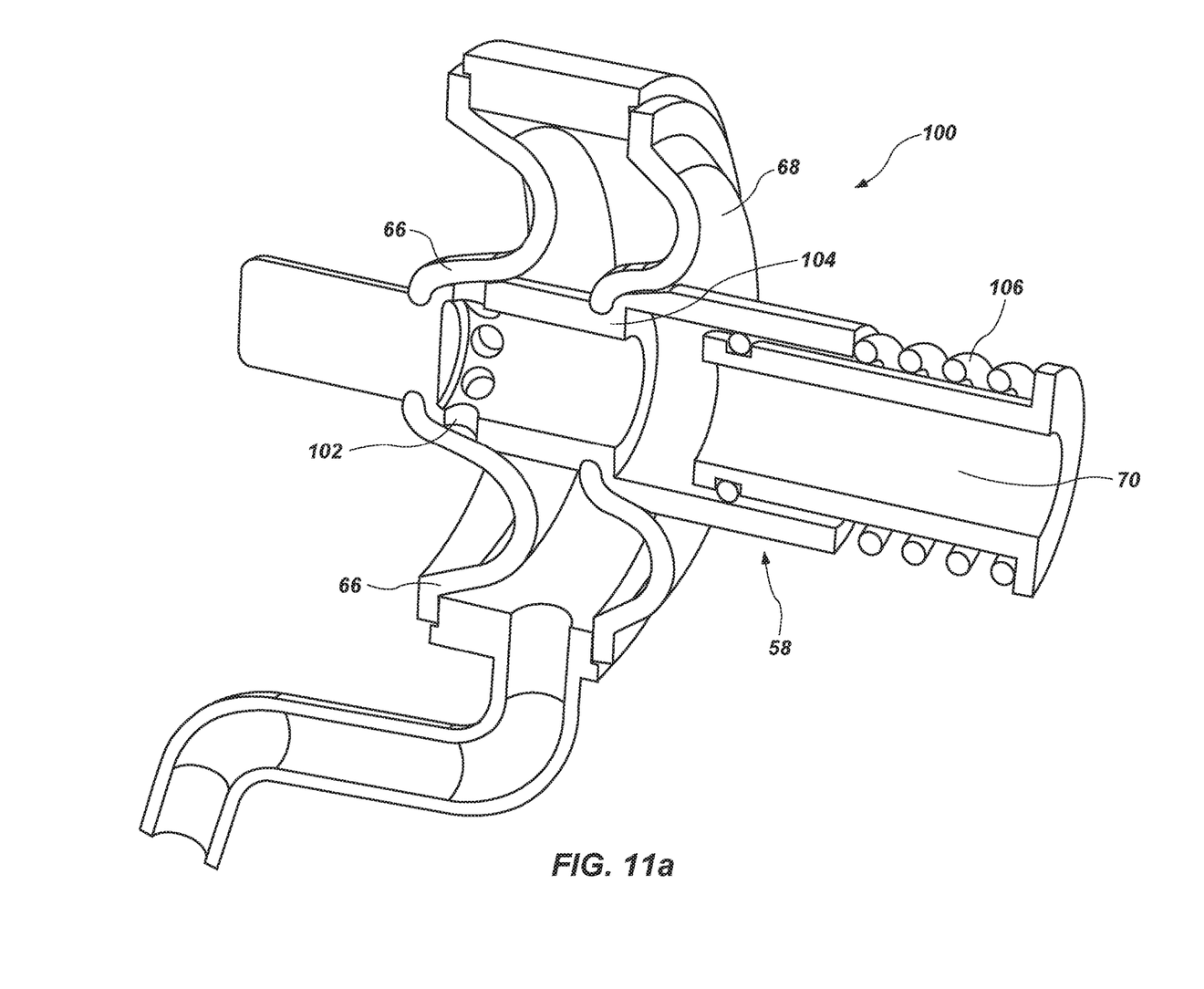
FIG. 11a illustrates a cross-sectional perspective view of a Venturi system in a first configuration.
Figure 11B:
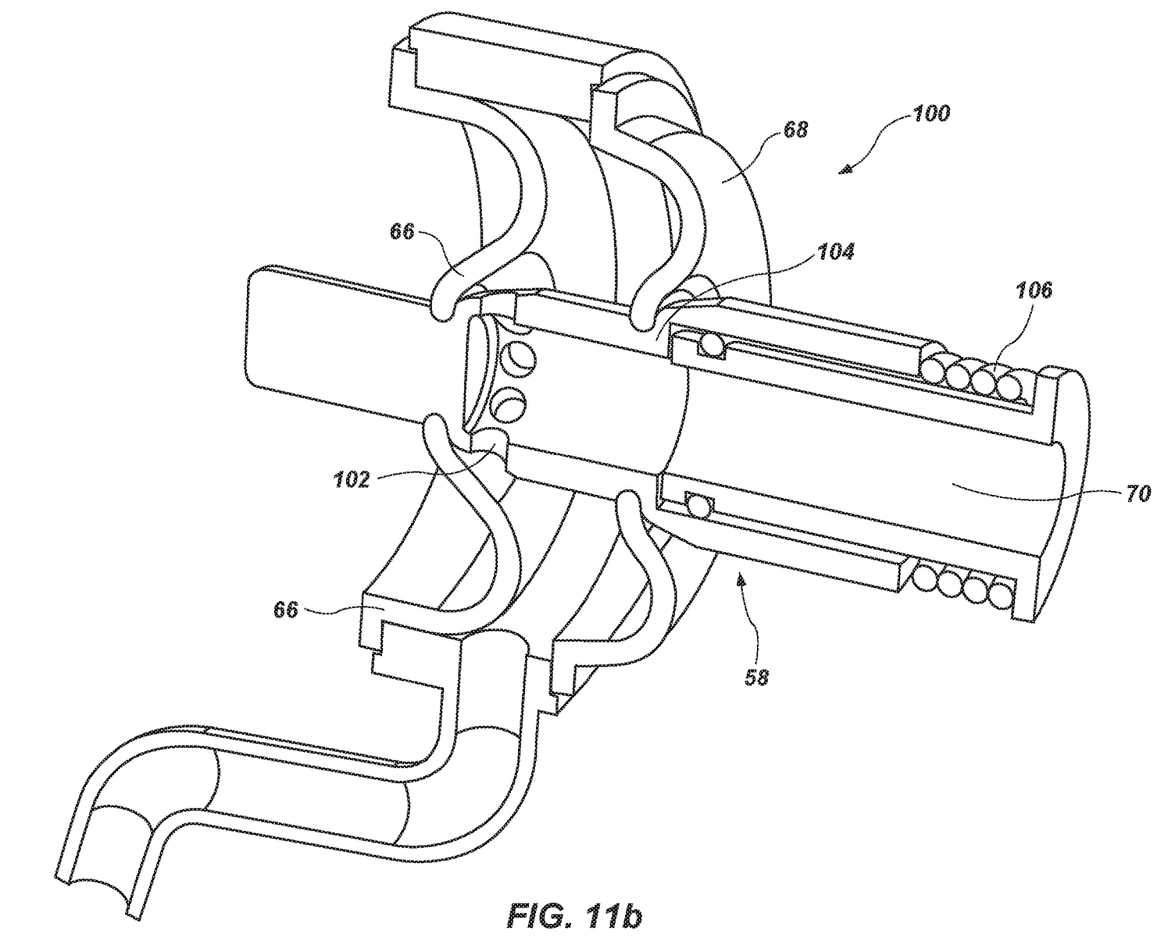
FIG. 11b illustrates a cross-sectional perspective view of the Venturi system of FIG. 11a in a second configuration.

One example of the Venturi system 100 is depicted in FIGS. 11a and 11b. In this magnified depiction of the Venturi 58. Referring to FIG. 11a, the rolling seal 66 is depicted sealing at least one Venturi port 102 and covering the at least one Venturi port 102 to prevent the additive from entering a valve 104 (or mixing chamber 70 as previously disclosed herein) within the Venturi system 100. The rolling seal 66 may be substantially cylindrical such that is circumferentially surrounds the valve 104. Actuation of the rolling seal 66 may be accomplished a number of ways. As depicted in the present embodiment a spring 106 may be utilized to force the rolling seal into place to seal the Venturi port 102. The force of the spring 106 may be overcome with a push button that compresses the spring 106 and exposes the Venturi port allowing the additive to enter the valve 104. The additive may pass between the rolling seal 66 and the diaphragm seal 68. The Venturi port 102 may include a plurality of ports that are spaced around the perimeter of the valve 104. The Venturi plurality of ports 102 may be spaced equidistant from one another. The rolling seal 66 may circumferentially seal each of the Venturi plurality of ports 102.

Alternate methods, or embodiments, of actuation may include hydraulic, pneumatic, electrical solenoid, cam, lever, etc. It could also be actuated by axial movement from either side of the rolling seal. for example, suction on the line could pull the valve 104 in and open the Venturi ports 102, by solely suction pressure on the inlet line as depicted.

Alternatively, this Venturi system 100 may also be a pressure relief valve. With sufficient pressure on the line it may off seat the rolling seal.

While the system may be primarily comprised of a polymers and rubbers it will be appreciated that many of the components considered herein can be manufactured of many different materials including metals, alloys, plastics, rubbers and the like.

Although the foregoing disclosure provides many specifics, these should not be construed as limiting the scope any of the ensuing claims. Other embodiments may be devised which do not depart from the scopes of the claims. Features from different embodiments may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed:

1. A system for adding an additive to a substance comprising:
    a first component comprising:
        an inlet port allowing flow of a substance into the first component;
        an outlet port allowing flow of the substance out of the first component; and
        a first engagement feature as part of the first component;
    a second component reversibly engaged to the first component;
    a reservoir for maintaining an additive; and
    an assembly for adding the additive into the line of flow of the substance comprising;
        a Venturi system with at least one port and a rolling seal wherein the rolling seal circumferentially engages the Venturi system and a diaphragm seal wherein the diaphragm seal circumferentially engages the Venturi system; and an adjustment mechanism configured to adjust the amount of additive being added to the line of flow.

2. The system of claim 1, wherein the second component comprises a second engagement feature positioned to complementary fit with the first engagement feature.

3. The system of claim 2, wherein the first engagement feature comprises a post with a ridge and second engagement feature comprises an aperture configured to engage the post with the post exposed through the aperture.

4. The system of claim 1, wherein the second component comprises a void for receiving the reservoir.

5. The system of claim 4, wherein the reservoir and the void comprise complementary engagement features to secure the reservoir to the second component.

6. The system of claim 1, wherein the first component engages the reservoir wherein the first component comprises a straw extending from the first component into the reservoir.

7. The system of claim 1, wherein the adjustment mechanism comprises
a dial with a tab and a gear to provide tactile feedback of the additive for adjusting the amount of additive with predetermined points on the dial, wherein the dial is positioned at least partially around the outlet port.

8. A system for adding an additive to a substance comprising:
a first component comprising:
an inlet port allowing flow of a substance into the first component;
an outlet port allowing flow of the substance out of the first component;
at least one projection extending from the first component;
a second projection extending from the first component; and
a second aperture for receiving the second projection; wherein the at least one projection and second projection are positioned opposite each other; and wherein the at least one aperture and second aperture are positioned opposite each other; wherein the at least one projection and second projection clip into the at least one aperture and second aperture;
a second component reversibly engaged to the first component comprising:
at least one aperture for receiving the at least one projection;
a reservoir for maintaining an additive; and
an assembly for adding the additive into the line of flow of the substance.

9. The system of claim 8, wherein the second component comprises a void for receiving the reservoir.

10. The system of claim 9, wherein the reservoir and the void comprise complementary engagement features to secure the reservoir to the second component.

11. The system of claim 8, the assembly further comprising a Venturi system with at least one port and a rolling seal wherein the rolling seal circumferentially engages the Venturi system.

12. The system of claim 11, the assembly further comprising a diaphragm seal wherein the diaphragm seal circumferentially engages the Venturi system.

13. The system of claim 8, the assembly further comprising a dial for adjusting the amount of additive into the line of flow; wherein the dial circumferentially surrounds the outlet port.

14. A system for adding an additive to a substance comprising:
a first component comprising:
an inlet port allowing flow of a substance into the first component;
an outlet port allowing flow of the substance out of the first component;
at least one projection extending from the first component;
a second component reversibly engaged to the first component comprising:
at least one aperture for receiving the at least one projection; and
a void for receiving the reservoir, wherein the reservoir and the void comprise complementary engagement features to secure the reservoir to the second component;
a reservoir for maintaining an additive; and
an assembly for adding the additive into the line of flow of the substance.

15. The system of claim 14 comprising:
a second projection extending from the first component; and
a second aperture for receiving the second projection; wherein the at least one projection and second projection are positioned opposite each other; and wherein the at least one aperture and second aperture are positioned opposite each other; wherein the at least one projection and second projection clip into the at least one aperture and second aperture.

16. The system of claim 14, the assembly further comprising a Venturi system with at least one port and a rolling seal wherein the rolling seal circumferentially engages the Venturi system.

17. The system of claim 16, the assembly further comprising a diaphragm seal wherein the diaphragm seal circumferentially engages the Venturi system.

18. The system of claim 14, the assembly further comprising a dial for adjusting the amount of additive into the line of flow; wherein the dial circumferentially surrounds the outlet port.

* * * * *